(12) United States Patent
Ra et al.

(10) Patent No.: US 12,626,148 B2
(45) Date of Patent: May 12, 2026

(54) METHODS AND SYSTEMS FOR DISCOVERING AND CLASSIFYING APPLICATION ASSETS AND THEIR RELATIONSHIPS

(71) Applicant: JPMorgan Chase Bank, N.A., New York, NY (US)

(72) Inventors: Johnathan Seungtae Ra, Ridgewood, NJ (US); Sergei Z Maluszycki, Powell, OH (US); Mark A Jackson, Westerville, OH (US); John Wright, Ashland, KY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 1130 days.

(21) Appl. No.: 17/644,175

(22) Filed: Dec. 14, 2021

(65) Prior Publication Data

US 2022/0215270 A1 Jul. 7, 2022

Related U.S. Application Data

(60) Provisional application No. 63/134,314, filed on Jan. 6, 2021.

(51) Int. Cl.
*G06N 5/02* (2023.01)
*G06F 16/28* (2019.01)
*H04L 67/51* (2022.01)

(52) U.S. Cl.
CPC ............. *G06N 5/02* (2013.01); *G06F 16/285* (2019.01); *H04L 67/51* (2022.05)

(58) Field of Classification Search
CPC ........ G06F 16/285; G06F 21/577; G06F 8/75;
G06F 21/563; G06F 2221/033; G06F 8/70; G06F 16/288; G06F 21/552; G06F 21/57; G06F 2221/034; G06F 8/427; G06F 8/73; G06F 8/74; G06F 11/3604; G06F 11/3608; G06F 11/3612; H04L 67/51; H04L 41/12;
(Continued)

(56) References Cited

U.S. PATENT DOCUMENTS 10,678,679 B1 * 6/2020 Sonawale ........... G06F 11/3684
2008/0270462 A1 * 10/2008 Thomsen ............ G06F 16/2471
(Continued)

*Primary Examiner* — Evan Aspinwall
(74) *Attorney, Agent, or Firm* — GREENBLUM & BERNSTEIN, P.L.C.

(57) ABSTRACT

Various methods, apparatuses/systems, and media for implementing a data discovery module are disclosed. A repository includes one or more memories that stores application code for each application among a plurality of applications. A processor is operatively connected to the repository via a communication network. The processor scans the application source code for each application among the plurality of applications; identifies, in response to scanning, all technical assets and their relationships within each application; harvests technical metadata from the technical assets and their relationships to identify what information is used, stored, created, and moved by the application; implements machine learning algorithms to automatically assign descriptive and administrative metadata at a field level; loads the assigned descriptive and administrative metadata into an enterprise data catalog; and creates, in response to loading, a knowledge map, thereby providing a fine-grain level understanding of data within the technical assets.

12 Claims, 5 Drawing Sheets

400

(58) Field of Classification Search
CPC . H04L 41/16; H04L 41/085; G06Q 10/06313;
G06Q 10/06; G06Q 10/0637; G06N 5/02
USPC ......................................................... 707/736
See application file for complete search history.

(56)                    References Cited

U.S. PATENT DOCUMENTS

| | | | |
|---|---|---|---|
| 2009/0193433 A1* | 7/2009 | Maes ..................... | G06Q 10/06 |
| | | | 719/315 |
| 2012/0005205 A1* | 1/2012 | Bobick ................. | H04L 67/568 |
| | | | 707/736 |
| 2015/0082432 A1* | 3/2015 | Eaton ....................... | H04L 43/06 |
| | | | 726/23 |
| 2015/0310132 A1* | 10/2015 | Derstadt ............... | G06Q 10/10 |
| | | | 707/692 |
| 2020/0042543 A1* | 2/2020 | Barday ................... | H04L 63/20 |
| 2021/0144218 A1* | 5/2021 | Maier ................... | G06Q 40/00 |
| 2021/0256209 A1* | 8/2021 | Rafey ................... | G06F 40/295 |
| 2021/0266228 A1* | 8/2021 | Reehil ................... | H04L 41/22 |
| 2022/0027169 A1* | 1/2022 | Burman ................... | G06F 8/34 |

* cited by examiner

100

200

300

METHODS AND SYSTEMS FOR DISCOVERING AND CLASSIFYING APPLICATION ASSETS AND THEIR RELATIONSHIPS

CROSS-REFERENCE TO RELATED APPLICATIONS

This application claims the benefit of priority from U.S. Provisional Patent Application No. 63/134,314, filed Jan. 6, 2021, which is herein incorporated by reference in its entirety.

TECHNICAL FIELD

This disclosure generally relates to data governance, and, more particularly, to methods and apparatuses for discovering and classifying application assets and their relationships for the purpose of data lineage.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Data governance may be of importance for a large organization, such as J.P. Morgan and Chase (JPMC). In JPMC, there may be a large number of applications deployed to production and they may intercommunicate in order to deliver a business value. Describing data to keep accurate inventory for these applications is fundamental to data governance. It may seek to provide capabilities to answer some basic questions, for example, what data may be needed and where (data requirements), what data may be currently available (data in place—where data is held/stored), where does the data come from and go to (data in motion—the lineage of how data moves between one place and another), where should the data come from (data authority—designation of data locations and systems of record (SOR) and authoritative data sources (ADS)), what data should be shared the most (reference data), etc. Conventional tools may only provide manual tracking which is error prone and may prove to be extremely difficult and time consuming to manually keep track of this data, thereby failing to ensure accurate inventory and lineage information.

Conventional tools also lack capabilities to get to finer grained assets and to the code as required for adequate data control. Further, in this application programming interface (API) first world, data in motion may need to be captured and related at the right grain of execution (API/Events). Conventional tools lack capabilities of capturing and relating the data in motion at the right grain of execution.

Thus, there is a need for an automation of this inventory in order to provide a more precise ("fine-grain") understanding of data within the technical assets to solve today's data governance problem.

SUMMARY

The present disclosure, through one or more of its various aspects, embodiments, and/or specific features or sub-components, provides, among others, various systems, servers, devices, methods, media, programs, and platforms for implementing a language agnostic data discovery module for discovering and classifying application assets and their relationships for the purpose of data lineage, thereby providing a more precise ("fine-grain") understanding of data within the technical assets, but the disclosure is not limited thereto.

The present disclosure, through one or more of its various aspects, embodiments, and/or specific features or sub-components, also provides, among others, various systems, servers, devices, methods, media, programs, and platforms for implementing a data discovery module for automated data lineage which can discover extensive detail about the components of the application, but the disclosure is not limited thereto. This automated data lineage solution, according to exemplary embodiments, allows more detailed view of how data is stored within an application (i.e., identifies all data stores held by the application, identifies all tables and columns within those data stores, etc.), how data moves within an application (i.e., which services and events utilize data from the data store, which APIs distribute data from the data store, etc.), how data moves between applications when adjoining applications are scanned (i.e., which APIs distribute data to other applications, which batch files are sent to other applications, etc.), but the disclosure is not limited thereto.

The present disclosure, through one or more of its various aspects, embodiments, and/or specific features or sub-components, also provides, among others, various systems, servers, devices, methods, media, programs, and platforms for implementing a data discovery module that automatically captures assets and their relationships at the right grain, identify technical assets and relationships (through code scanners), harvests physical data structure, labels datasets with conceptual taxonomies, provides sustainable evergreen solution, provides accurate inventory and lineage information, provides appropriate controls at the right unit of management, provides impact analysis, etc., but the disclosure is not limited thereto.

According to an aspect of the present disclosure, a method for discovering and classifying application assets and their relationships by utilizing one or more processors and one or more memories is provided. The method is implemented by a processor on a computing device. The method may include: scanning application source code for each application among a plurality of applications; identifying, in response to scanning, all technical assets and their relationships within each application; harvesting technical metadata from the technical assets and their relationships to identify what information is used, stored, created, and moved by the application; implementing machine learning algorithms to automatically assign descriptive and administrative metadata at a field level; loading the assigned descriptive and administrative metadata into an enterprise data catalog; and creating, in response to loading, a knowledge map, thereby providing a fine-grain level understanding of data within the technical assets, but the disclosure is not limited thereto.

According to a further aspect of the present disclosure, the technical assets may include data stores, application programming interfaces (APIs) and services within each application, but the disclosure is not limited thereto.

According to yet another aspect of the present disclosure, the method may further include: automatically capturing the technical assets and their relationships at granular level.

According to a further aspect of the present disclosure, the method may further include: automatically performing data quality check for all discovered technical assets and their relationship; and initiating an application module workflow in response to a positive data quality check.

According to another aspect of the present disclosure, the knowledge map may include telemetry and reporting from the enterprise data catalog for automatic triggers, data risk score cards, and automated policy enforcement, but the disclosure is not limited thereto.

According to a further aspect of the present disclosure, the method may further include: labeling datasets from the technical assets with predefined conceptual taxonomies; publishing an event with payload based on the predefined conceptual taxonomies; and subscribing to the published event.

According to yet another aspect of the present disclosure, the method may further include: automatically updating the knowledge map in response to subscribing to the published event.

According to a further aspect of the present disclosure, the method may further include: automatically updating inventory of applications in response to subscribing to the published event.

According to another aspect of the present disclosure, a computing device or a system configured to implement an execution of a method for discovering and classifying application assets and their relationships is provided. The computing device or the system may include a display screen, a processor, a memory, and a communication interface coupled to each of the processor, the memory, and the display screen. When the method is being executed, the processor may be configured to: scan the application source code for each application among the plurality of applications; identify, in response to scanning, all technical assets and their relationships within each application; harvest technical metadata from the technical assets and their relationships to identify what information is used, stored, created, and moved by the application; implement machine learning algorithms to automatically assign descriptive and administrative metadata at a field level; load the assigned descriptive and administrative metadata into an enterprise data catalog; and create, in response to loading, a knowledge map, thereby providing a fine-grain level understanding of data within the technical assets, but the disclosure is not limited thereto.

According to yet another aspect of the present disclosure, the processor may be further configured to: automatically capture the technical assets and their relationships at granular level.

According to a further aspect of the present disclosure, the processor may be further configured to: automatically perform data quality check for all discovered technical assets and their relationship; and initiate an application module workflow in response to a positive data quality check.

According to an additional aspect of the present disclosure, the processor may be further configured to: label datasets from the technical assets with predefined conceptual taxonomies; publish an event with payload based on the predefined conceptual taxonomies; and subscribe to the published event.

According to yet another aspect of the present disclosure, the processor may be further configured to: automatically update the knowledge map in response to subscribing to the published event.

According to a further aspect of the present disclosure, the processor may be further configured to: automatically update inventory of applications in response to subscribing to the published event.

According to another aspect of the present disclosure, a non-transitory computer readable medium configured to store instructions for discovering and classifying application assets and their relationships implemented by a processor embedded within a computing device is disclosed. The instructions, when executed, may cause a processor to perform the following: scanning application source code for each application among a plurality of applications; identifying, in response to scanning, all technical assets and their relationships within each application; harvesting technical metadata from the technical assets and their relationships to identify what information is used, stored, created, and moved by the application; implementing machine learning algorithms to automatically assign descriptive and administrative metadata at a field level; loading the assigned descriptive and administrative metadata into an enterprise data catalog; and creating, in response to loading, a knowledge map, thereby providing a fine-grain level understanding of data within the technical assets, but the disclosure is not limited thereto.

According to yet another aspect of the present disclosure, the instructions, when executed, may further cause the processor to perform the following: automatically capturing the technical assets and their relationships at granular level.

According to a further aspect of the present disclosure, the instructions, when executed, may further cause the processor to perform the following: automatically performing data quality check for all discovered technical assets and their relationship; and initiating an application module workflow in response to a positive data quality check.

According to an additional aspect of the present disclosure, the instructions, when executed, may further cause the processor to perform the following: labeling datasets from the technical assets with predefined conceptual taxonomies; publishing an event with payload based on the predefined conceptual taxonomies; and subscribing to the published event.

According to yet another aspect of the present disclosure, the instructions, when executed, may further cause the processor to perform the following: automatically updating the knowledge map in response to subscribing to the published event.

According to a further aspect of the present disclosure, the instructions, when executed, may further cause the processor to perform the following: automatically updating inventory of applications in response to subscribing to the published event.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
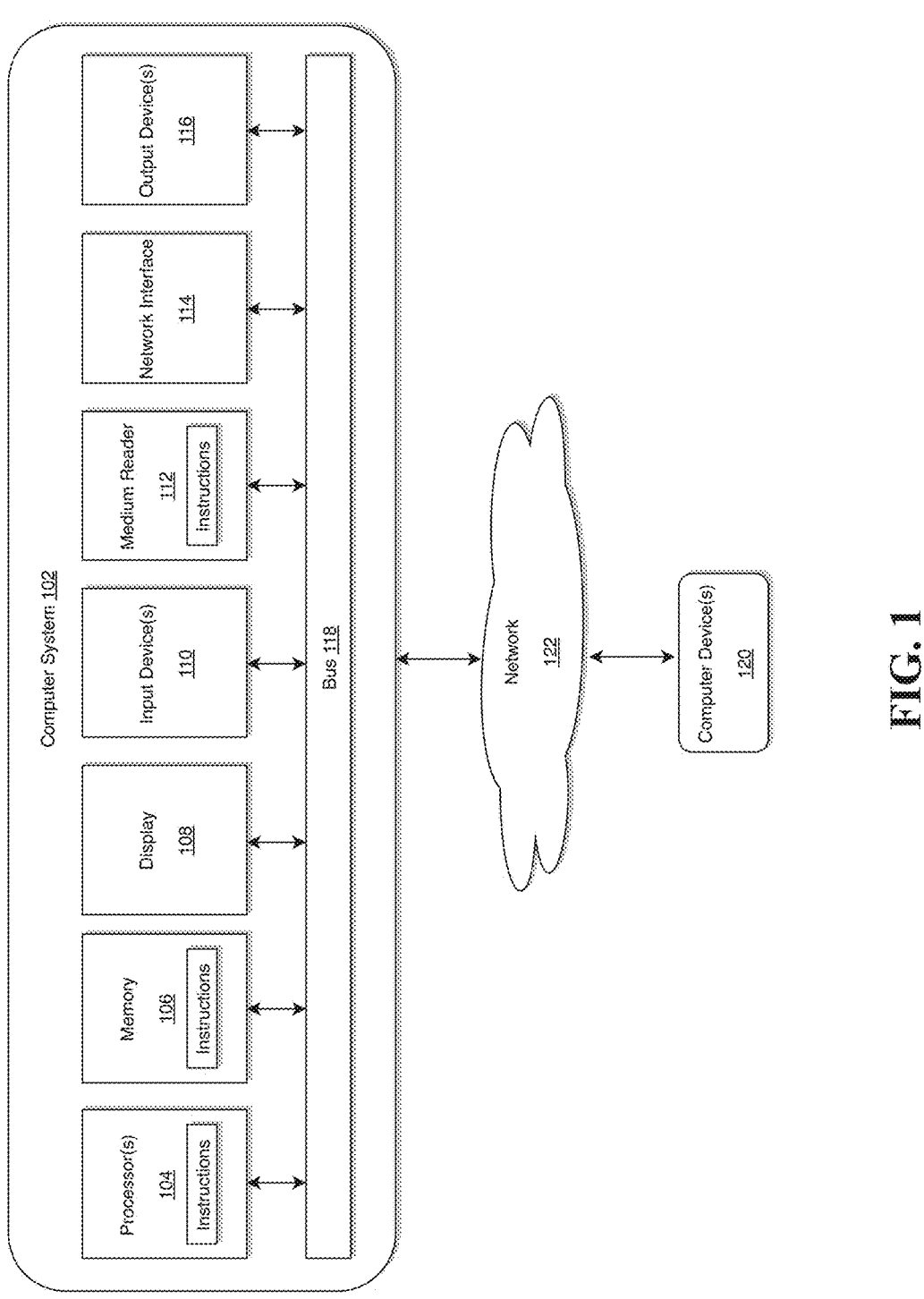
FIG. 1 illustrates a computer system for discovering and classifying application assets and their relationships, according to an example embodiment.

Through one or more of its various aspects, embodiments and/or specific features or sub-components of the present disclosure, are intended to bring out one or more of the advantages as specifically described above and noted below.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an example system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a data discovery module for discovering and classifying application assets and their relationships for the purpose of data lineage, thereby providing a more precise ("fine-grain") understanding of data within the technical assets, but the disclosure is not limited thereto.

Figure 2:
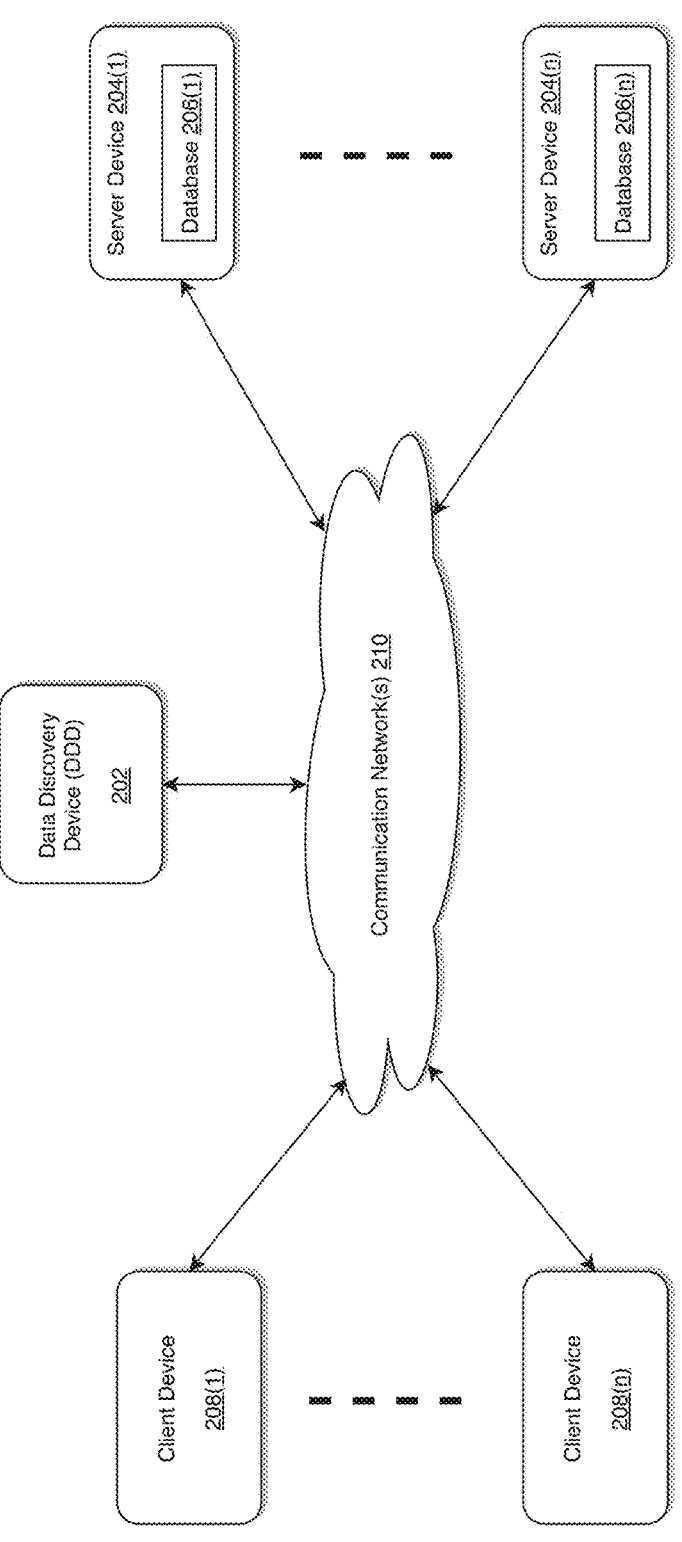
FIG. 2 illustrates a diagram of a network environment for implementing a data discovery device for discovering and classifying application assets and their relationships, according to an example embodiment.

Referring to FIG. 2, a schematic of an exemplary network environment 200 for implementing a data discovery device is illustrated. In an exemplary embodiment, the data discovery device is executable on any networked computer platform, such as, for example, a wireless mobile communication device, i.e., a smart phone.

According to exemplary embodiments, the above-described problems associated with conventional method and systems may be overcome by implementing a DDD 202 as illustrated in FIG. 2 by implementing a data discovery module for discovering and classifying application assets and their relationships for the purpose of data lineage, thereby providing a more precise ("fine-grain") understanding of data within the technical assets, but the disclosure is not limited thereto.

The data discovery device (DDD) 202 may be the same or similar to the computer system 102 as described with respect to FIG. 1. The DDD 202 may store one or more applications that can include executable instructions that, when executed by the DDD 202, cause the DDD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DDD 202 itself, may be located in virtual server(s) running in a cloud-based computing environment rather than being tied to one or more specific physical network computing devices. Also, the application(s) may be running in one or more virtual machines (VMs) executing on the DDD 202. Additionally, in one or more embodiments of this technology, virtual machine(s) running on the DDD 202 may be managed or supervised by a hypervisor.

In the network environment 200 of FIG. 2, the DDD 202 is coupled to a plurality of server devices 204(1)-204(n) that hosts a plurality of databases 206(1)-206(n), and also to a plurality of client devices 208(1)-208(n) via communication network(s) 210. A communication interface of the DDD 202, such as the network interface 114 of the computer system 102 of FIG. 1, operatively couples and communicates between the DDD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DDD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DDD 202 may be a standalone device or integrated with one or more other devices or apparatuses, such as one or more of the server devices 204(1)-204(n), for example. In one particular example, the DDD 202 may be hosted by one of the server devices 204(1)-204(n), and other arrangements are also possible. Moreover, one or more of the devices of the DDD 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DDD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DDD 202 that may be configured for implementing a data discovery module for discovering and classifying application assets and their relationships for the purpose of data lineage, thereby providing a more precise ("fine-grain") understanding of data within the technical assets, but the disclosure is not limited thereto.

Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, of other document collaborative software for example.

The client devices 208(1)-208(n) may run interface applications, such as standard web browsers or standalone client applications, which may provide an interface to communicate with the DDD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DDD 202, the server devices 204(1)-204(n), the client devices 208(1)-208(n), and the communication network(s)

210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DDD 202, the server devices 204(1)-204(n), or the client devices 208(1)-208(n), for example, may be configured to operate as virtual instances on the same physical machine. For example, one or more of the DDD 202, the server devices 204(1)-204(n), or the client devices 208(1)-208(n) may operate on the same physical device rather than as separate devices communicating through communication network(s) 210. Additionally, there may be more or fewer DDDs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
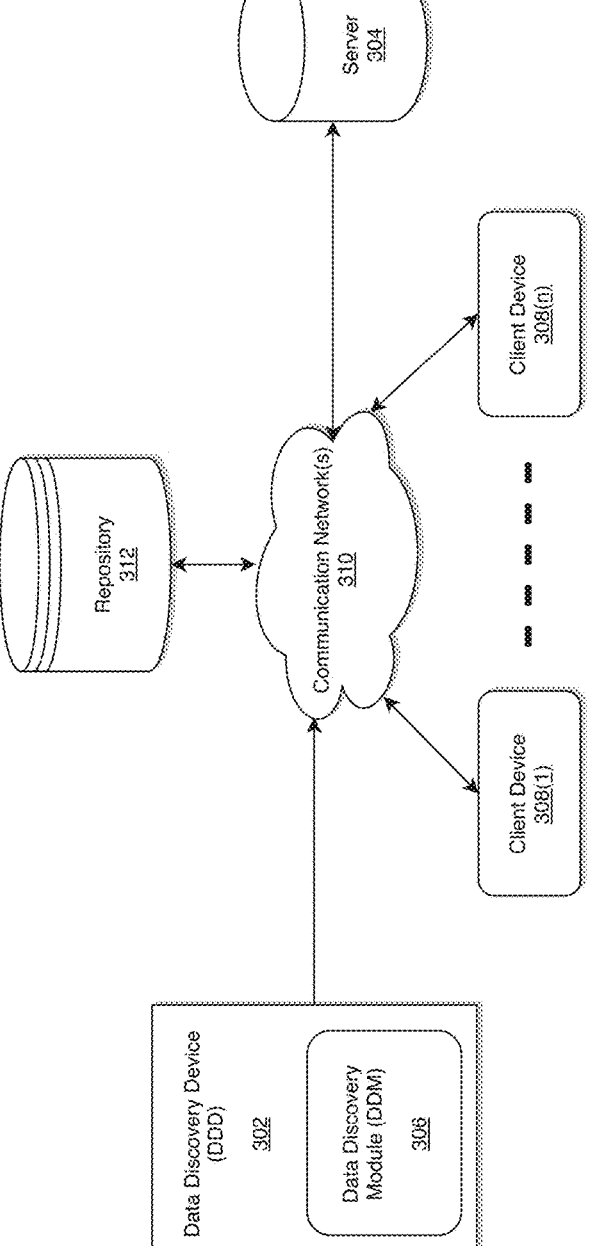
FIG. 3 shows a system for implementing a data discovery device with a data discovery module for discovering and classifying application assets and their relationships module, according to an example embodiment.

FIG. 3 illustrates a system diagram 300 for implementing a DDD with a data discovery module (DDM) in accordance with an exemplary embodiment.

As illustrated in FIG. 3, the DDD 302 including the DDM 306 may be connected to a server 304, and a repository 312 via a communication network 310. The DDD 302 may also be connected to a plurality of client devices 308(1)-308(n) via the communication network 310, but the disclosure is not limited thereto. According to exemplary embodiments, the DDM 306 may be implemented within the client devices 308(1)-308(n), but the disclosure is not limited thereto. According to exemplary embodiments, the client devices 308(1)-308(n) may be utilized for software application development and machine learning model generations, but the disclosure is not limited thereto.

According to exemplary embodiment, the DDD 302 is described and shown in FIG. 3 as including the DDM 306, although it may include other rules, policies, modules, databases, or applications, for example. According to exemplary embodiments, the repository 312 may be embedded within the DDD 302. Although only one repository 312 is illustrated in FIG. 3, according to exemplary embodiments, a plurality of repositories 312 may be provided. The repository 312 may include one or more memories configured to store application source code for each application among a plurality of applications, login information, data files, data content, API specification definition file (e.g., in JSON format) etc., but the disclosure is not limited thereto. For example, the repository 312 may include one or more memories configured to store information including: applications (i.e., Java applications) rules, programs, production requirements, configurable threshold values defined by a product team to validate against service level objective (SLO), machine learning models, log data, hash values, etc., but the disclosure is not limited thereto. According to exemplary embodiments, the DDM 306 may be configured to be storage platform agnostic—configured to be deployed across multiple storage layers.

According to exemplary embodiments, the DDM 306 may be configured to receive continuous feed of data from the repository 312 and the server 304 via the communication network 310.

As will be described below, the DDM 306 may be configured to scan the application source code for each application among the plurality of applications; identify, in response to scanning, all technical assets and their relationships within each application; harvest technical metadata from the technical assets and their relationships to identify what information is used, stored, created, and moved by the application; implement machine learning algorithms to automatically assign descriptive and administrative metadata at a field level; load the assigned descriptive and administrative metadata into an enterprise data catalog; and create, in response to loading, a knowledge map, thereby providing a fine-grain level understanding of data within the technical assets, but the disclosure is not limited thereto.

The plurality of client devices 308(1)-308(n) are illustrated as being in communication with the DDD 302. In this regard, the plurality of client devices 308(1)-308(n) may be "clients" of the DDD 302 and are described herein as such. Nevertheless, it is to be known and understood that the plurality of client devices 308(1)-308(n) need not necessarily be "clients" of the DDD 302, or any entity described in association therewith herein. Any additional or alternative relationship may exist between either or more of the plurality of client devices 308(1)-308(n) and the DDD 302, or no relationship may exist.

One of the plurality of client devices 308(1)-308(n) may be, for example, a smart phone or a personal computer. Of course, the plurality of client devices 308(1)-308(n) may be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either one or more of the plurality of client devices 308(1)-308(n) may communicate with the DDD 302 via broadband or cellular communication. Of course, these embodiments are merely exemplary and are not limiting or exhaustive.

Figure 4:
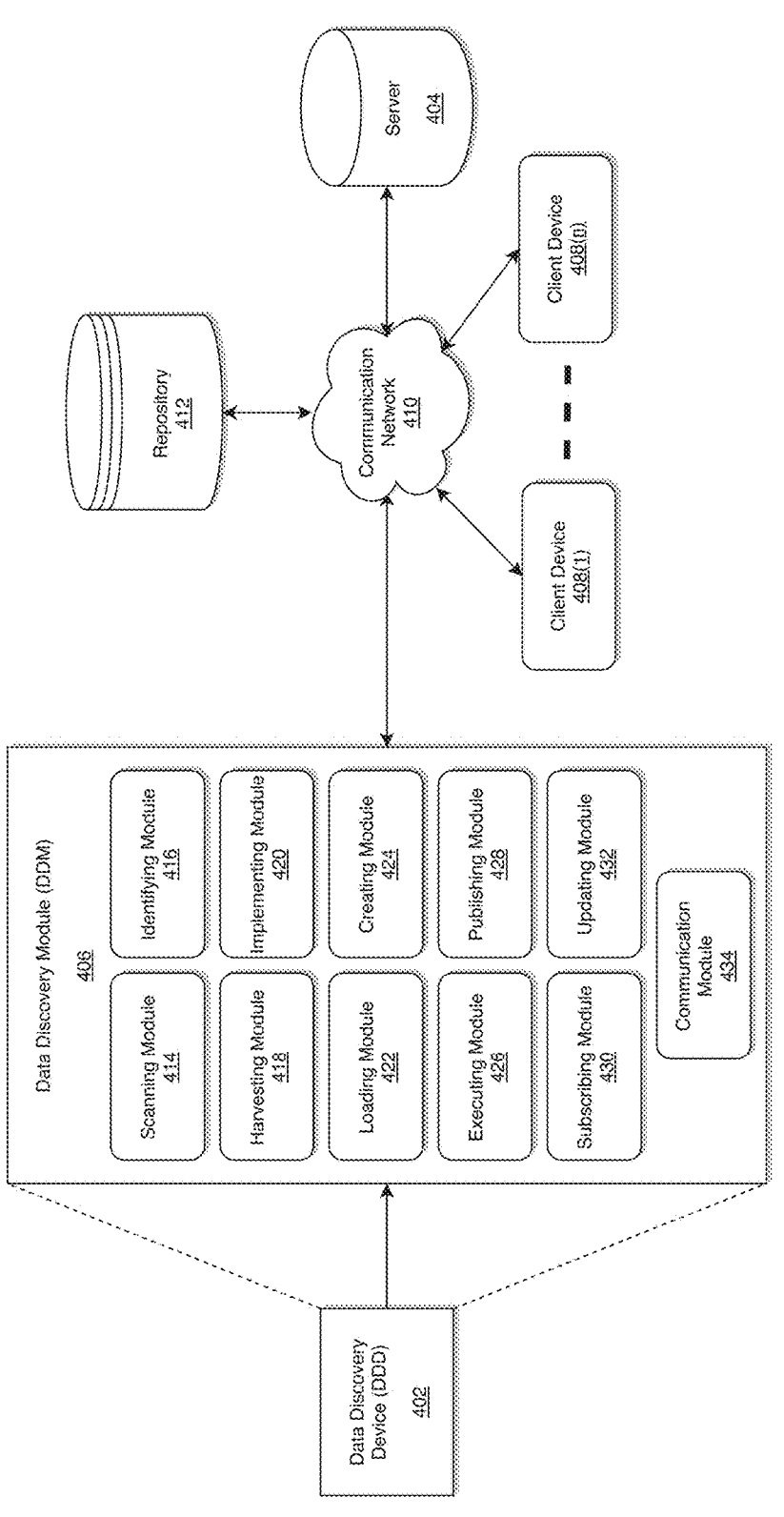
FIG. 4 shows a system for implementing a data discovery device having a data discovery module of FIG. 3, according to an example embodiment.

FIG. 4 illustrates a system diagram for implementing a DDM of FIG. 3 in accordance with an exemplary embodiment. As illustrated in FIG. 4, the system 400 may include a DDD 402 within which a DDM 406 may be embedded, a repository 412, a server 404, client devices 408(1)-408(n), and a communication network 410. According to exemplary embodiments, the DDD 402, DDM 406, repository 412, the server 404, the client devices 408(1)-408(n), and the communication network 410 as illustrated in FIG. 4 may be the same or similar to the DDD 302, the DDM 306, the repository 312, the server 304, the client devices 308(1)-308(n), and the communication network 310, respectively, as illustrated in FIG. 3.

According to exemplary embodiments, the repository 312, 412 may also be a private cloud-based repository that supports user authentication, repository security, and integration with existing databases and developments as well as stores open API specification definition file (i.e., in JSON format) corresponding to an application, but the disclosure is not limited thereto.

As illustrated in FIG. 4, the DDM 406 may include a scanning module 414, an identifying module 416, a harvesting module 418, an implementing module 420, a loading module 422, a creating module 424, an executing module 426, a publishing module 428, a subscribing module 430, an updating module 432, and a communication module 434. According to exemplary embodiments, the repository 412 may be external to the DDD 402 may include various systems that are managed and operated by an organization. Alternatively, according to exemplary embodiments, the repository 412 may be embedded within the DDD 402 and/or the DDM 406.

According to exemplary embodiments, the DDM 406 may be implemented via user interfaces, e.g., web user interface, a build automation tool used primarily for Java projects, private Jenkins, etc., but the disclosure is not limited thereto, and may be integrated with a private cloud platform via the DDM 406 and an authentication service, but the disclosure is not limited thereto. The user interface may be operatively connected to a system of record in one end and an open source platform for analytics and dashboard in another end.

The process may be executed via the communication module 434 and the communication network 410, which may comprise plural networks as described above. For example, in an exemplary embodiment, the various components of the DDM 406 may communicate with the server 404, and the repository 412 via the communication module and the communication network 410. Of course, these embodiments are merely exemplary and are not limiting or exhaustive.

According to exemplary embodiments, the communication network 410 and the communication module 434 may be configured to establish a link between the repository 412, the client devices 408(1)-408(n) and the DDM 406.

According to exemplary embodiments, each of the scanning module 414, identifying module 416, harvesting module 418, implementing module 420, loading module 422, creating module 424, executing module 426, publishing module 428, subscribing module 430, updating module 432, and the communication module 434 may be implemented by microprocessors or similar, they may be programmed using software (e.g., microcode) to perform various functions discussed herein and may optionally be driven by firmware and/or software.

Alternatively, according to exemplary embodiments, each of the scanning module 414, identifying module 416, harvesting module 418, implementing module 420, loading module 422, creating module 424, executing module 426, publishing module 428, subscribing module 430, updating module 432, and the communication module 434 may be implemented by dedicated hardware, or as a combination of dedicated hardware to perform some functions and a processor (e.g., one or more programmed microprocessors and associated circuitry) to perform other functions.

Also, according to exemplary embodiments, each of the scanning module 414, identifying module 416, harvesting module 418, implementing module 420, loading module 422, creating module 424, executing module 426, publishing module 428, subscribing module 430, updating module 432, and the communication module 434 may be physically separated into two or more interacting and discrete blocks, units, devices, and/or modules without departing from the scope of the inventive concepts.

According to exemplary embodiments, each of the scanning module 414, identifying module 416, harvesting module 418, implementing module 420, loading module 422, creating module 424, executing module 426, publishing module 428, subscribing module 430, updating module 432, and the communication module 434 of the DDM 406 may be called by corresponding API, but the disclosure is not limited thereto.

According to exemplary embodiments, the scanning module 414 may be configured to scan application source code for each application among a plurality of applications. The identifying module 416 may be configured to identify, in response to scanning, all technical assets and their relationships within each application.

According to exemplary embodiments, the harvesting module 418 may be configured to harvest technical metadata from the technical assets and their relationships to identify what information is used, stored, created, and moved by the application.

According to exemplary embodiments, the implementing module 420 may be configured to implement machine learning algorithms to automatically assign descriptive and administrative metadata at a field level. The loading module 422 may be configured to load the assigned descriptive and administrative metadata into an enterprise data catalog.

According to exemplary embodiments, the creating module 424 may be configured to create, in response to loading, a knowledge map, thereby providing a fine-grain level understanding of data within the technical assets, but the disclosure is not limited thereto.

Appendix A and Appendix B (submitted with the U.S. Provisional Patent Application No. 63/134,314, filed Jan. 6, 2021, to which this application claims the benefit of priority) the entirety of each of which is incorporated herein by reference, provide further details of the methods implemented by each of the scanning module 414, identifying module 416, harvesting module 418, implementing module 420, loading module 422, creating module 424, executing module 426, publishing module 428, subscribing module 430, updating module 432, and the communication module 434 of the DDM 406.

According to exemplary embodiments, the technical assets may include data stores, application programming interfaces (APIs) and services within each application, but the disclosure is not limited thereto.

According to exemplary embodiments, the DDM 406 may automatically capture the technical assets and their relationships at granular level. Exemplary relationships at granular level are illustrated in Appendix A.

According to exemplary embodiments, the executing module 426 may be configured to automatically perform data quality check for all discovered technical assets and their relationship; and initiate an application module workflow in response to a positive data quality check.

According to exemplary embodiments, the knowledge map may include telemetry and reporting from the enterprise data catalog for automatic triggers, data risk score cards, and automated policy enforcement, but the disclosure is not limited thereto. See, e.g., Appendix A and Appendix B.

According to exemplary embodiments, the DDM 406 may label datasets from the technical assets with predefined conceptual taxonomies and the publishing module 428 may publish an event with payload based on the predefined conceptual taxonomies. The subscribing module 430 may be utilized to subscribe to the published event. According to exemplary embodiments, the updating module 432 may automatically update the knowledge map in response to subscribing to the published event. According to exemplary embodiments, the updating module 432 may also automatically update inventory of applications in response to subscribing to the published event. See, e.g., Appendix A and Appendix B.

Figure 5:
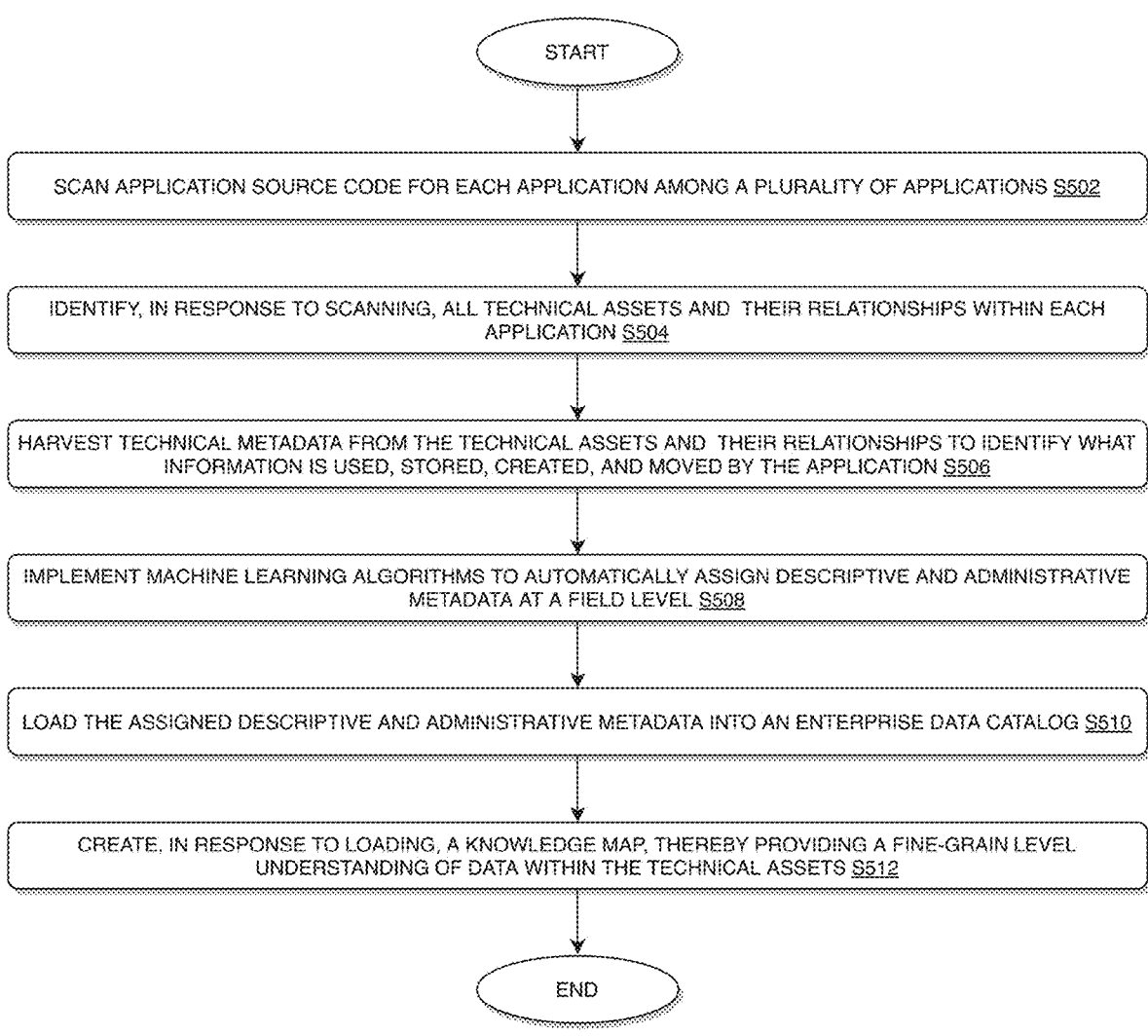
FIG. 5 illustrates a flow diagram for discovering and classifying application assets and their relationships, according to an example embodiment.

FIG. 5 illustrates a flow diagram for discovering and classifying application assets and their relationships in accordance with an exemplary embodiment. It will be appreciated that the illustrated process 500 and associated steps may be performed in a different order, with illustrated steps omitted, with additional steps added, or with a combination of reordered, combined, omitted, or additional steps.

At step S502, the process 500 may scan application source code for each application among a plurality of applications.

At step S504, the process 500 may identify, in response to scanning, all technical assets and their relationships within each application. The technical assets may include data stores, application programming interfaces (APIs) and services within each application, but the disclosure is not limited thereto.

At step S506, the process 500 may harvest technical metadata from the technical assets and their relationships to identify what information is used, stored, created, and moved by the application.

At step S508, the process 500 may implement machine learning algorithms to automatically assign descriptive and administrative metadata at a field level.

At step S510, the process 500 may load the assigned descriptive and administrative metadata into an enterprise data catalog.

At step S512, the process 500 may create, in response to loading, a knowledge map, thereby providing a fine-grain level understanding of data within the technical assets, but the disclosure is not limited thereto. See, e.g., Appendix A and Appendix B. According to exemplary embodiments, the knowledge map may include telemetry and reporting from the enterprise data catalog for automatic triggers, data risk score cards, and automated policy enforcement, but the disclosure is not limited thereto. See, e.g., Appendix A and Appendix B.

According to exemplary embodiments, the process 500 may further include: automatically capturing the technical assets and their relationships at granular level.

According to exemplary embodiments, the process 500 may further include: automatically performing data quality check for all discovered technical assets and their relationship; and initiating an application module workflow in response to a positive data quality check.

According to exemplary embodiments, the process 500 may further include: labeling datasets from the technical assets with predefined conceptual taxonomies; publishing an event with payload based on the predefined conceptual taxonomies; and subscribing to the published event.

According to exemplary embodiments, the process 500 may further include: automatically updating the knowledge map in response to subscribing to the published event.

According to exemplary embodiments, the process 500 may further include: automatically updating inventory of applications in response to subscribing to the published event.

According to exemplary embodiments, the DDD 402 may include a memory (e.g., a memory 106 as illustrated in FIG. 1) which may be a non-transitory computer readable medium that may be configured to store instructions for implementing a DDM 406 for discovering and classifying application assets and their relationships as disclosed herein. The DDD 402 may also include a medium reader (e.g., a medium reader 112 as illustrated in FIG. 1) which may be configured to read any one or more sets of instructions, e.g., software, from any of the memories described herein. The instructions, when executed by a processor embedded within the DDM 406 or within the DDD 402, may be used to perform one or more of the methods and processes as described herein. In a particular embodiment, the instructions may reside completely, or at least partially, within the memory 106, the medium reader 112, and/or the processor 104 (see FIG. 1) during execution by the DDD 402.

For example, the instructions, when executed, may cause the processor 104 to perform the following: scanning application source code for each application among a plurality of applications; identifying, in response to scanning, all technical assets and their relationships within each application; harvesting technical metadata from the technical assets and their relationships to identify what information is used, stored, created, and moved by the application; implementing machine learning algorithms to automatically assign descriptive and administrative metadata at a field level; loading the assigned descriptive and administrative metadata into an enterprise data catalog; and creating, in response to loading, a knowledge map, thereby providing a fine-grain level understanding of data within the technical assets, but the disclosure is not limited thereto.

According to exemplary embodiments, the instructions, when executed, may further cause the processor 104 to perform the following: automatically capturing the technical assets and their relationships at granular level.

According to exemplary embodiments, the instructions, when executed, may further cause the processor 104 to perform the following: automatically performing data quality check for all discovered technical assets and their relationship; and initiating an application module workflow in response to a positive data quality check.

According to exemplary embodiments, the instructions, when executed, may further cause the processor 104 to perform the following: labeling datasets from the technical assets with predefined conceptual taxonomies; publishing an event with payload based on the predefined conceptual taxonomies; and subscribing to the published event.

According to exemplary embodiments, the instructions, when executed, may further cause the processor 104 to perform the following: automatically updating the knowledge map in response to subscribing to the published event.

According to exemplary embodiments, the instructions, when executed, may further cause the processor 104 to perform the following: automatically updating inventory of applications in response to subscribing to the published event.

According to exemplary embodiments as disclosed above in FIGS. 1-5, technical improvements effected by the instant disclosure may include platforms for implementing a data discovery module for discovering and classifying application assets and their relationships for the purpose of data lineage, thereby providing a more precise ("fine-grain") understanding of data within the technical assets, but the disclosure is not limited thereto.

According to exemplary embodiments as disclosed above in FIGS. 1-5, technical improvements effected by the instant disclosure may include platforms for implementing a data discovery module for automated data lineage which can discover extensive detail about the components of the application, but the disclosure is not limited thereto. This automated data lineage solution, according to exemplary embodiments as illustrated in FIGS. 1-5, allows more detailed view of how data is stored within an application (i.e., identifies all data stores held by the application, identifies all tables and columns within those data stores, etc.), how data moves within an application (i.e., which services and events utilize data from the data store, which APIs distribute data from the data store, etc.), how data moves between applications when adjoining applications are scanned (i.e., which APIs distribute data to other applications, which batch files are sent to other applications, etc.), but the disclosure is not limited thereto.

According to exemplary embodiments as disclosed above in FIGS. 1-5, technical improvements effected by the instant disclosure may include platforms for implementing a data discovery module that automatically captures assets and their relationships at the right grain, identify technical assets and relationships (through code scanners), harvests physical data structure, labels datasets with conceptual taxonomies, provides sustainable evergreen solution, provides accurate inventory and lineage information, provides appropriate controls at the right unit of management, provides impact analysis, etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular processes, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory (RAM) or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in example embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of the entirety of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for discovering and classifying application assets and their relationships corresponding to an application by utilizing one or more processors and one or more memories, the method comprising:

implementing, by a language-agnostic data discovery device (DDD), a language-agnostic data discovery module (DDM), wherein the one or more processors are embedded within the DDD, wherein the DDM is configured to discover and classify assets of the application and their relationships for the purpose of automated data lineage, thereby providing a fine-grain understanding of data within the technical assets, wherein the DDM includes a plurality of modular application programming interfaces (APIs) corresponding respectively to a scanning module, an identifying module, a harvesting module, an implementing module, a loading module, a creating module, a publishing module, a subscribing module, and an updating module, wherein each module being called via a corresponding API;

scanning, by calling the scanning module via a first API, application source code stored in a repository embedded within the DDD, the repository including one or more memories configured to store application source code, API specification definition files, data files, and machine learning models for a plurality of applications;

identifying, in response to scanning, all technical assets and their relationships within each application by calling the identifying module via a second API, wherein the fine-grain understanding of data refers to identifying all data stores held by application, and identifying all tables and columns within the data stores corresponding to each application;

harvesting, in response to identifying all tables and columns within the data stores, by calling the harvesting module via a third API, metadata from the identified technical assets and relationships to determine how data is stored, used, created, or moved within the application and between adjoining applications;

implementing machine learning algorithms stored in the repository to automatically assign descriptive and administrative metadata at a field level by calling the implementing module via a fourth API;

loading the assigned descriptive and administrative metadata into an enterprise data catalog by calling the loading module via a fifth API;

creating, in response to loading, by calling the creating module via a sixth API, a fine-grain data lineage map representing movement of data within and across applications;

automatically capturing, by the DDM, the technical assets and their relationships at the fine-grain level based on the lineage map;

labeling, by the DDM, datasets from the technical assets with predefined taxonomies stored in the repository;

publishing an event with payload corresponding to the predefined taxonomies by calling the publishing module via a seventh API;

subscribing to the published event by calling the subscribing module via an eight API to monitor data movement; and automatically updating the lineage map in response to subscribing to the published event by calling the updating module via a ninth API, wherein the DDD and DDM are operable within a cloud-based computing environment configured to be storage-platform agnostic.

2. The method according to claim 1, wherein the technical assets include data stores, the APIs and services within each application.

3. The method according to claim 1, wherein the map includes telemetry and reporting from the enterprise data catalog for automatic triggers, data risk score cards, and automated policy enforcement.

4. The method according to claim 1, further comprising: automatically updating inventory of applications in response to subscribing to the published event.

5. A system for discovering and classifying application assets and their relationships corresponding to an application, the system comprising:

a repository including one or more memories that stores application code for each application among a plurality of applications; and a processor operatively connected to the repository via a communication network, wherein the processor is configured to:

implement, by a language-agnostic data discovery device (DDD), a language-agnostic data discovery module (DDM), wherein the one or more processors are embedded within the DDD, wherein the DDM is configured to discover and classify assets of the application and their relationships for the purpose of automated data lineage, thereby providing a fine-grain understanding of data within the technical assets, wherein the DDM includes a plurality of modular application programming interfaces (APIs) corresponding respectively to a scanning module, an identifying module, a harvesting module, an implementing module, a loading module, a creating module, a publishing module, a subscribing module, and an updating module, wherein each module being called via a corresponding API;

scan, by calling the scanning module via a first API, application source code stored in a repository embedded within the DDD, the repository including one or more memories configured to store application source code, API specification definition files, data files, and machine learning models for a plurality of applications;

identify, in response to scanning, all technical assets and their relationships within each application by calling the identifying module via a second API, wherein the fine-grain understanding of data refers to identifying all data stores held each application, and identifying all tables and columns within the data stores corresponding to each application;

harvest, in response to identifying all tables and columns within the data stores, by calling the harvesting module via a third API, metadata from the identified technical assets and relationships to determine how data is stored, used, created, or moved within the application and between adjoining applications;

implement machine learning algorithms stored in the repository to automatically assign descriptive and administrative metadata at a field level by calling the implementing module via a fourth API;

load the assigned descriptive and administrative metadata into an enterprise data catalog by calling the loading module;

create, in response to loading, by calling the creating module via a sixth API, a fine-grain data lineage map representing movement of data within and across applications;

automatically capture, by the DDM, the technical assets and their relationships at the fine-grain level based on the lineage map;

label, by the DDM, datasets from the technical assets with predefined taxonomies stored in the repository;

publish an event with payload corresponding to the predefined taxonomies by calling the publishing module via a seventh API;

subscribe to the published event by calling the subscribing module via an eight API to monitor data movement; and automatically update the lineage map in response to subscribing to the published event by calling the updating module via a ninth API, wherein the DDD and DDM are operable within a cloud-based computing environment configured to be storage-platform agnostic.

6. The system according to claim 5, wherein the technical assets include data stores, the APIs, and services within each application.

7. The system according to claim 5, wherein the map includes telemetry and reporting from the enterprise data catalog for automatic triggers, data risk score cards, and automated policy enforcement.

8. The system according to claim 5, wherein the processor is further configured to:

automatically update inventory of applications in response to subscribing to the published event.

9. A non-transitory computer readable medium configured to store instructions for discovering and classifying application assets and their relationships corresponding to an application, wherein when executed, the instructions cause a processor to perform the following:

implementing, by a language-agnostic data discovery device (DDD), a language-agnostic data discovery module (DDM), wherein the one or more processors are embedded within the DDD, wherein the DDM is configured to discover and classify assets of the application and their relationships for the purpose of automated data lineage, thereby providing a fine-grain understanding of data within the technical assets, wherein the DDM includes a plurality of modular application programming interfaces (APIs) corresponding respectively to a scanning module, an identifying module, a harvesting module, an implementing module, a loading module, a creating module, a publishing module, a subscribing module, and an updating module, wherein each module being called via a corresponding API;

scanning, by calling the scanning module via a first API, application source code stored in a repository embedded within the DDD, the repository including one or more memories configured to store application source code, API specification definition files, data files, and machine learning models for a plurality of applications;

identifying, in response to scanning, all technical assets and their relationships within each application by calling the identifying module via a second API, wherein the fine-grain understanding of data refers to identifying all data stores held by each application, and identifying all tables and columns within the data stores corresponding to each application;

harvesting, in response to identifying all tables and columns within the data stores, by calling the harvesting module via a third API, metadata from the identified technical assets and relationships to determine how data is stored, used, created, or moved within the application and between adjoining applications;

implementing machine learning algorithms stored in the repository to automatically assign descriptive and administrative metadata at a field level by calling the implementing module via a fourth API;

loading the assigned descriptive and administrative metadata into an enterprise data catalog by calling the loading module via a fifth API;

creating, in response to loading, by calling the creating module via a sixth API, a fine-grain data lineage map representing movement of data within and across applications;

automatically capturing, by the DDM, the technical assets and their relationships at the fine-grain level based on the lineage map;

labeling, by the DDM, datasets from the technical assets with predefined taxonomies stored in the repository;

publishing an event with payload corresponding to the predefined taxonomies by calling the publishing module via a seventh API;

subscribing to the published event by calling the subscribing module via an eight API to monitor data movement; and automatically updating the lineage map in response to subscribing to the published event by calling the updating module via a ninth API, wherein the DDD and DDM are operable within a cloud-based computing environment configured to be storage-platform agnostic.

10. The non-transitory computer readable medium according to claim 9, wherein when executed, the instructions cause the processor to perform the following:

automatically updating inventory of applications in response to subscribing to the published event.

11. The non-transitory computer readable medium according to claim 9, wherein the technical assets include data stores, the APIs and services within each application.

12. The non-transitory computer readable medium according to claim 9, wherein the map includes telemetry and reporting from the enterprise data catalog for automatic triggers, data risk score cards, and automated policy enforcement.

* * * * *